United States Patent
Khojastepour

(10) Patent No.: US 12,245,258 B2
(45) Date of Patent: Mar. 4, 2025

(54) BEAMFORMING AND OPPORTUNISTIC FAIR SCHEDULING FOR 5G WIRELESS COMMUNICATION SYSTEMS

(71) Applicant: NEC Laboratories America, Inc., Princeton, NJ (US)

(72) Inventor: Mohammad Khojastepour, Lawrenceville, NJ (US)

(73) Assignee: NEC Corporation, Tokyo (JP)

( * ) Notice: Subject to any disclaimer, the term of this patent is extended or adjusted under 35 U.S.C. 154(b) by 367 days.

(21) Appl. No.: 17/714,505

(22) Filed: Apr. 6, 2022

(65) Prior Publication Data

US 2022/0346107 A1    Oct. 27, 2022

Related U.S. Application Data

(60) Provisional application No. 63/172,277, filed on Apr. 8, 2021.

(51) Int. Cl.
*H04W 72/54*      (2023.01)

(52) U.S. Cl.
CPC ................... *H04W 72/54* (2023.01)

(58) Field of Classification Search
CPC ................. H04W 72/54; H04L 5/14
See application file for complete search history.

(56) References Cited

FOREIGN PATENT DOCUMENTS

| WO | WO-2014036025 A1 * | 3/2014 | ............. H04L 5/14 |
|----|---------------------|--------|------------------------|
| WO | WO-2017222511 A1 * | 12/2017 | ......... H04L 5/0007 |

OTHER PUBLICATIONS

S. Shahsavari, F. Shirani, M. A. Amir Khojastepour and E. Erkip, "Opportunistic Temporal Fair Mode Selection and User Scheduling for Full-duplex Systems," 2019 IEEE 30th International Symposium on Personal, Indoor and Mobile Radio Communications (PIMRC Workshops), (Year: 2019) Istanbul, Turkey, 2019, pp. 1-7, doi: 10.1109/PIMRCW.2019.8880848. keywords: {Interference;Signal to noise ratio;Job shop scheduling;Silicon carbide;Conferences;Wireless communication;Downlink}, (Year: 2019).*

Capozzi, Francesco, et al. "Downlink packet scheduling in LTE cellular networks: Key design issues and a survey." IEEE communications surveys & tutorials 15.2 (2012): 678-700.

* cited by examiner

*Primary Examiner* — Huy D Vu
*Assistant Examiner* — Latha Chakravarthy
(74) *Attorney, Agent, or Firm* — Joseph Kolodka

(57) ABSTRACT

A method for implementing opportunistic user scheduling under long-term and short-term resource fairness constraints is presented. The method includes enabling a base station to communicate with a plurality mobile devices handled by a plurality of users within a single-cell wireless communication network, deriving a feasible region of resource block (RB) fairness vectors by enabling an opportunistic scheduler to select active users from the plurality of users at each RB, implementing an optimal user scheduling strategy to maximize system utility by optimizing, via the opportunistic scheduler, transmit power and user mode selection, wherein the optimal user scheduling strategy includes a threshold-based strategy (TBS) phase and a compensation phase, and employing a short-term resource fair scheduling strategy satisfying user resource demands over a finite window-length.

18 Claims, 6 Drawing Sheets

BEAMFORMING AND OPPORTUNISTIC FAIR SCHEDULING FOR 5G WIRELESS COMMUNICATION SYSTEMS

RELATED APPLICATION INFORMATION

This application claims priority to Provisional Application No. 63/172,277, filed on Apr. 8, 2021, the contents of which are incorporated herein by reference in their entirety.

BACKGROUND

Technical Field

The present invention relates to wireless communication in millimeter wave frequency bands and, more particularly, to beamforming and opportunistic fair scheduling for 5G wireless communication systems.

Description of the Related Art

The physical layer design of the fifth generation of wireless communication systems incorporates several improvements over prior generations. The use of the millimeter wave (mmWave) frequency band requires more elaborate and enhanced beamforming design both in the transmit and receive chains to combat the effect of signal attenuation and shadowing in millimeter wave bands. A more advanced receiver is also necessary to increase the data rate, as well as the possibility of decoding low power signals of the users that are masked by the signals of the closer users which are received with higher powers. Full duplex communications have also emerged to improve the spectral efficiency, in particular for the terminals which can exploit multiple antennas and achieve a higher level of self-interference cancellation.

SUMMARY

A method for implementing opportunistic user scheduling under long-term and short-term resource fairness constraints is presented. The method includes enabling a base station to communicate with a plurality mobile devices handled by a plurality of users within a single-cell wireless communication network, deriving a feasible region of resource block (RB) fairness vectors by enabling an opportunistic scheduler to select active users from the plurality of users at each RB, implementing an optimal user scheduling strategy to maximize system utility by optimizing, via the opportunistic scheduler, transmit power and user mode selection, wherein the optimal user scheduling strategy includes a threshold-based strategy (TBS) phase and a compensation phase, and employing a short-term resource fair scheduling strategy satisfying user resource demands over a finite window-length.

A non-transitory computer-readable storage medium comprising a computer-readable program for implementing opportunistic user scheduling under long-term and short-term resource fairness constraints is presented. The computer-readable program when executed on a computer causes the computer to perform the steps of enabling a base station to communicate with a plurality mobile devices handled by a plurality of users within a single-cell wireless communication network, deriving a feasible region of resource block (RB) fairness vectors by enabling an opportunistic scheduler to select active users from the plurality of users at each RB, implementing an optimal user scheduling strategy to maximize system utility by optimizing, via the opportunistic scheduler, transmit power and user mode selection, wherein the optimal user scheduling strategy includes a threshold-based strategy (TBS) phase and a compensation phase, and employing a short-term resource fair scheduling strategy satisfying user resource demands over a finite window-length.

A system for implementing opportunistic user scheduling under long-term and short-term resource fairness constraints is presented. The system includes a memory and one or more processors in communication with the memory configured to enable a base station to communicate with a plurality mobile devices handled by a plurality of users within a single-cell wireless communication network, derive a feasible region of resource block (RB) fairness vectors by enabling an opportunistic scheduler to select active users from the plurality of users at each RB, implement an optimal user scheduling strategy to maximize system utility by optimizing, via the opportunistic scheduler, transmit power and user mode selection, wherein the optimal user scheduling strategy includes a threshold-based strategy (TBS) phase and a compensation phase, and employ a short-term resource fair scheduling strategy satisfying user resource demands over a finite window-length.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
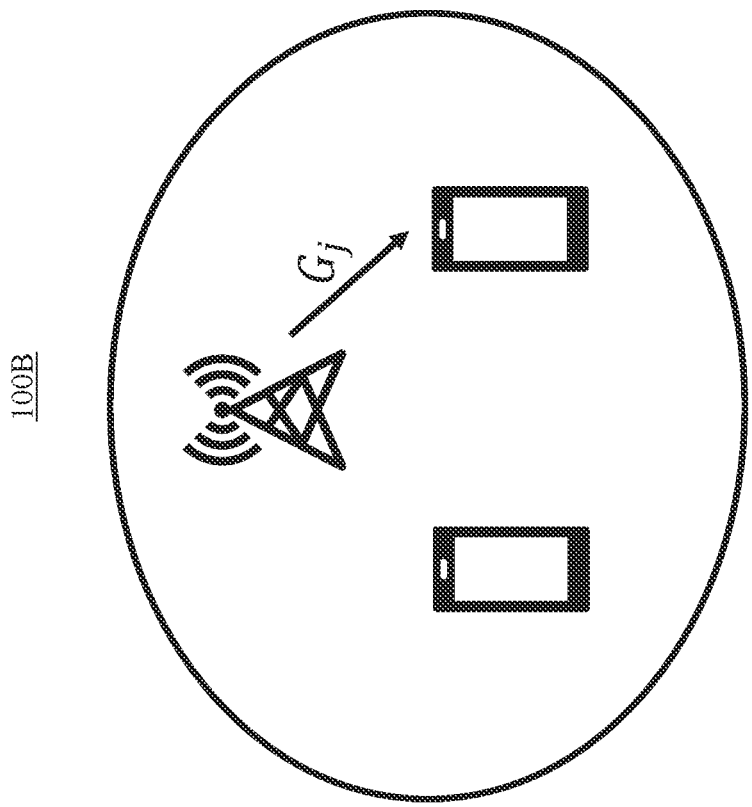
FIG. 1 is a block/flow diagram of an exemplary HD-UL mode of operation and a HD-DL mode of operation, in accordance with embodiments of the present invention.
Figure 1:
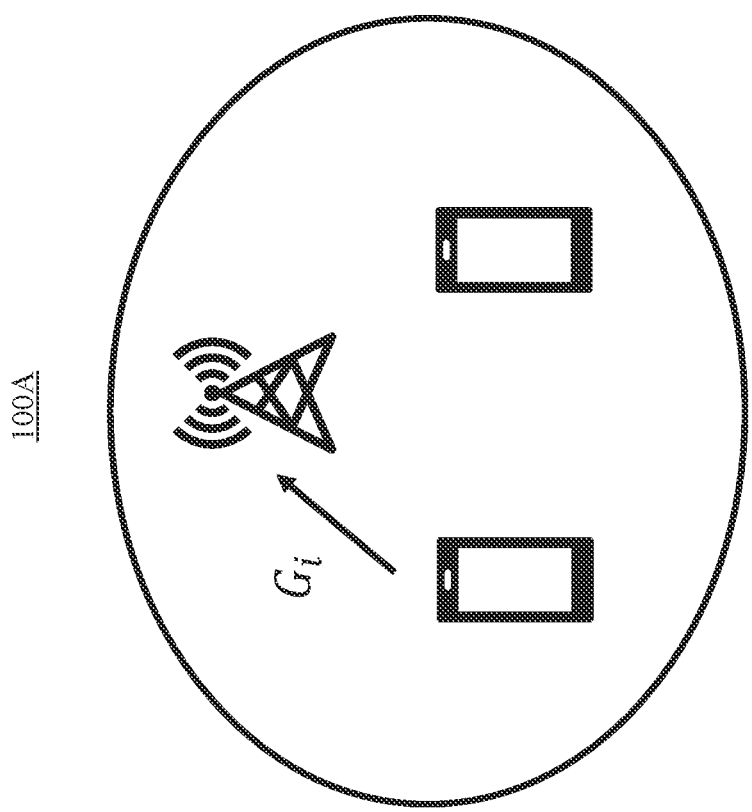

The application of in-band full-duplex (FD) radios enables simultaneous uplink (UL) and downlink (DL) communication over a common frequency band which can potentially lead to significant multiplexing gains. Several studies demonstrate the feasibility of FD radios and investigate the challenges and opportunities in FD systems.

Self-interference at the FD base station (BS), as well as inter-user interference (IUI) between the active UL and DL users are among major barriers in achieving large multiplexing gains with FD operations. Recent advances in antenna and radio frequency circuit design have led to significant progress in efficient self-interference mitigation. Furthermore, opportunistic scheduling along with successive interference cancellation (SIC) decoding methods at the DL receiver can be used to further suppress IUI.

In conventional FD systems, the user terminals are assumed to be half-duplex (HD). The main reason for this is the nonlinear distortion due to analog impairments which is an important barrier to provide sufficiently large SIM in mobile-scale devices which usually utilize low-cost mass-produced components. Consequently, a common assumption in most of the prior works is that the BS is able to communicate in FD mode, whereas the users are legacy HD devices. As a result, to exploit FD gains in such scenarios, the BS should communicate with separate users in UL and DL communications. Yet another common assumption is that the HD user activated in the DL direction treats IUI as noise when there is a simultaneous in-band transmission in the UL direction. While such assumptions allow for less complex and more cost-effective implementations, they can restrict FD throughput gains in several scenarios. For instance, if the distribution of the HD users is concentrated around a few hotspots within each cell, strong IUI among several user pairs would reduce the incentive to activate two users simultaneously since it can lead to a considerable loss in the downlink rates as. The exemplary embodiments of the present invention relax these assumptions and provide opportunistic mode selection and user scheduling mechanisms to retrieve the FD and beamforming gains in such scenarios.

Although the users are assumed to be HD in conventional systems, it is argued that the advent of new FD antenna and transceiver designs has facilitated the implementation of FD radios in compact user devices. For example, prior works provide analog/RF designs to build compact full-duplex devices and nodes such as smartphones and tablets by using complementary metal oxide semiconductor (CMOS) technology facilitating low cost and dense integration. Furthermore, it is shown that using adaptive non-linear digital cancellation, highly efficient SIM can be achieved also in a mobile device, despite nonlinear components and limited hardware resources. Besides FD capable users, advanced decoding techniques such as SIC can be applied at the DL user to suppress IUI. Using SIC, the DL user first decodes and removes IUI, and then decodes the intended DL signal. However, one may need to reduce the UL data rate for the IUI to be decodable at the DL user. Hence, performing SIC is most efficient when the IUI channel is strong (e.g., when the system operates at high interference regime) since in that case, the DL user can decode the UL signal without UL rate reduction. The application of SIC has also been proposed for non-orthogonal multiple access (NOMA) in fifth generation wireless networks (5G) and standards which further motivates efficient and low-cost future implementations.

Figure 2:
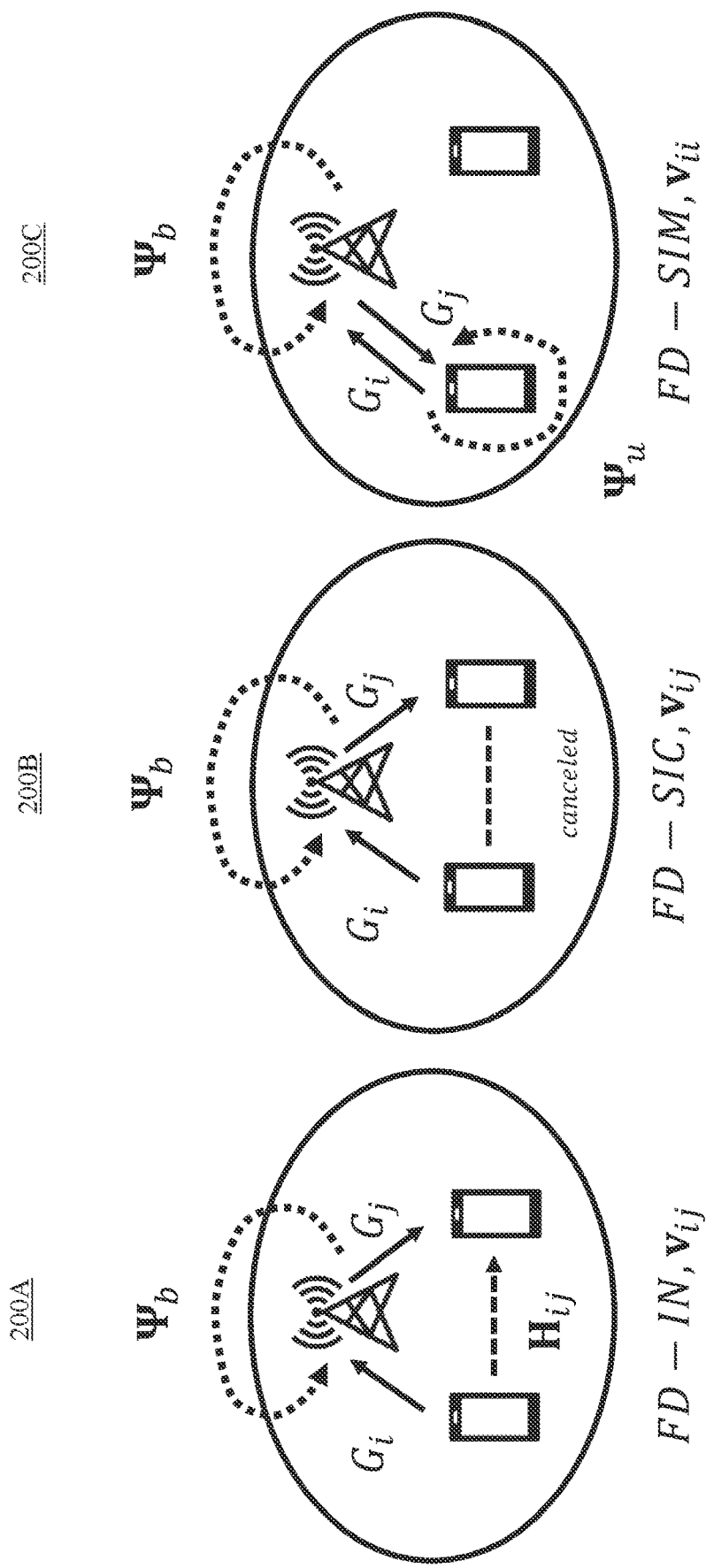
FIG. 2 is a block/flow diagram of exemplary FD-IN mode of operation, FD-SIC mode of operation, and FD-SIM mode of operation, in accordance with embodiments of the present invention.

The exemplary embodiments of the preset invention consider a single-cell scenario where the DL user either treats the UL interference (e.g., IUI) as noise or performs SIC to mitigate the IUI. Furthermore, the user may be equipped with FD capability, which allows bi-directional communication with the BS. Consequently, as shown in FIGS. 1 and 2, the FD system of interest may operate in five modes of operation at each resource block, that is, HD-UL mode (100A), where only UL transmission occurs, HD-DL (100B), where only a DL user is activated, FD-IN (200A), where IUI is treated as noise, FD-SIC (200B), where SIC is used to decode and cancel IUI in DL, and FD-SIM (200C), where a single user is activated in both UL and DL using SIM to suppress the self-interference.

To fully enable the throughput multiplexing gains in a FD system, it is necessary to design an optimized strategy for choosing the active user(s) and the mode of operation. An opportunistic scheduler selects the active user(s) at each resource block, the transmit/receive beamforming vectors, as well as the mode of operation and optimizes the transmit power to maximize the resulting system utility subject to fairness criteria. Furthermore, in the FD-SIC and FD-IN modes, the scheduler activates pairs of UL and DL users such that the impact of IUI is minimized.

There has been a large body of research on quantifying fairness in user scheduling. Various criteria on the users' quality of service (QoS) have been proposed to model fairness of the scheduling strategies. For half-duplex (HD) systems, scheduling under utilitarian, proportional, and temporal fairness criteria have been studied. Temporal fairness is of interest in delay sensitive applications, where a system with predictable latency may be more desirable than a system with highly variable latency, but potentially higher throughput. Resource block fairness is a generalized form of temporal fairness which considers a sequence of resource blocks that are ordered in time.

Resource block fairness exhibits the same properties of temporal fairness in terms of latency while it is more general in terms of fair distribution of the resources between the users. Short-term fair schedulers guarantee that each user is activated in at least a predefined fraction of a resource block at each finite scheduling window of the resource block sequence, whereas under long-term fairness, the resource demands are met over infinitely large window-lengths. Temporal fair scheduling has been investigated in HD wireless local area networks (WLAN) and HD cellular systems. Furthermore, scheduling under long-term temporal fairness in FD systems has been considered, where a heuristic scheduler is provided by modifying an optimal temporal fair HD scheduler. However, long-term and short-term resource fair scheduling have not been investigated before. Moreover, the exemplary scheduling framework of the exemplary embodiments considers optimization on user mode selection based on the possibility of full duplex, more advanced receivers jointly with beamforming, and power optimization.

The optimal user scheduling under long-term and short-term fairness in NOMA systems has been previously considered. The exemplary embodiments extend the results in several aspects which makes the exemplary embodiments suitable for 5G wireless communication systems. First, in direct contrast to the prior work on NOMA systems, the exemplary methods consider the orthogonal frequency divisions multiplexing (OFDM) physical layer, which is used in 5G wireless communication systems. Second, the exemplary methods formalize resource fair scheduling which in lieu of temporal fair scheduling which is more appropriate measure of fairness. Third, the exemplary methods consider the possibility of full duplex communication and use of more advanced receivers. Finally, the exemplary methods also jointly optimize the transmit and receive beamforming and power in the user scheduling problem.

The exemplary methods first consider long-term resource fairness and prove that a class of scheduling strategies called threshold-based strategies (TBSs) achieve optimal system utility under this fairness criterion. TBSs are characterized by a set of thresholds each of which is assigned to one user. For each resource block in the sequence, a TBS chooses an operation mode among the available ones as well as the corresponding active user(s) based on the user thresholds and the channel realization in that timeslot. One of the objectives is to find the optimal user thresholds maximizing the system utility while satisfying fairness constraints. Optimal thresholds can be interpreted as the optimal Lagrangian multipliers corresponding to the resource fairness constrains.

It is argued that the optimal thresholds are functions of the statistics of the channel coefficients. Hence, the exemplary methods prove that the proposed algorithm results in an optimal resource fair scheduler irrespective of the choice of the initial resource block sequence. Since the statistics of the channel coefficients are not explicitly known a priori, the exemplary methods provide a low-complexity online algorithm to estimate the optimal thresholds by using causal observation of channel realization obtained by channel estimation. Next, the exemplary methods implement the problem under short-term fairness constraints where the resource demands are required to be satisfied over a fixed window-length. The exemplary methods devise a mode selection and scheduling strategy under short-term resource fairness constraints whose average utility is shown to converge to the optimal utility as the scheduling window-length grows asymptotically large.

The exemplary methods represent random variables by capital letters such as X, U. Sets are denoted by calligraphic letters such as $\mathcal{X}$, $\mathcal{U}$. The set of numbers $\{1, 2, \ldots, n\}$, $n \in \mathbb{N}$ is represented by $[n]$. The vector $x=(x_1, x_2, \ldots, x_n)$ is represented by $x^n$ to denote the size of the vector. The vectors of length two such as $(x_1, x_2)$ are simply represented by x. The random variable $\mathbb{1}_{\mathcal{A}}$ is the indicator function of the event $\mathcal{A}$. Sets of vectors are shown using sans-serif letters such as $\vee$. A Hermitian of a matrix A is denoted by $A^H$.

The exemplary methods consider a single-cell scenario including n users and one FD base station (BS). The user set is denoted by $\mathcal{U} = \{u_1; u_2, \ldots, u_n\}$. The users may have FD or HD capability. Subsets of UL and DL users which can be activated simultaneously are referred to as virtual users. The set of virtual users is denoted by $\vee \subseteq \{v_{i,j} | i,j \in [n] \cup \{0\}\}$ where $v_{i,j}$ signifies the instance when the ith user is activated in UL and the jth user is activated in DL.

If i (j) is equal to zero, then the BS operates in the HD UL (DL) mode. In the case that the ith user does not possess the FD capability, the virtual user $v_{i,j}$ is not included in $\vee$. The propagation channel coefficient between user $u_i$ and the BS which captures small-scale and large-scale fading effects at time-slot t is denoted by $G_{i,j}$. Similarly, the channel between users $u_i$ and $u_j$ at time-slot t is denoted by $H_{i,j,t}$, $i \neq j$. It is assumed that the channel coefficients $G_{i,j,t}$ $i \in [n]$ and $H_{i,j,t}$, $j \in [n]$ are independent over time. Additionally, it is assumed that the channels are reciprocal. It is further noted that the index 0 corresponds to the BS.

Hence, the received signal at the BS (node j=0) when the virtual user $v_{i,0}$ is selected, e.g., the user i is active in the uplink is given by:

$$y_0 = W_i^H G_{i,t}^H x_i + z_0$$

where $z_0$ denotes a vector of Gaussian noise with the variance $N_{UL}$, $x_i$ denotes the transmitted signal by the node i and $y_i$ denotes the received signal by node i, where the index i=0s refers to the base station. The receive beamforming matrix is denoted by $W^H$. The received signal at the node j when the virtual user $v_{0,j}$ is selected, e.g., the user j is active in the downlink is given by:

$$y_j = G_{j,t} U_j x_0 + z_j$$

where U is the transmit beamforming matrix used at the base station and $z_j$ is the vector of Gaussian noise at the user j with variance $N_{DL}^j$. For simplicity, the exemplary methods consider all users to have identical noise power $N_{DL}^j = N_{DL}$. The received signal at the base station (node i=0) when the virtual user $v_{i,j}$ is selected, e.g., the user i is active in the uplink and the user j is active in the downlink is given by:

$$y_0 = W_i^H G_{i,t}^H x_i + z_0$$

since the base station is capable of self-interference cancellation. The signal received at node j is given by:

$$y_j = G_{j,t} U_j x_0 + H_{i,j,t} x_i + z_j$$

It is noted that the user equipped with multiple antennas can also use transmit and receive beamforming. The exemplary methods assume that the channel matrices $G_{i,t}$, $i \in [n]$ and $H_{i,j,t}$, $i \neq j$ are known at the BS. More precisely, when user $u_i$ transmits its channel training sequence, not only the BS can learn channel coefficient $G_{i,t}$, but also the user $u_j$ can estimate $H_{i,j,t}$. Once the inter-user channel coefficients are estimated by the users, they can send these channel coefficients to the BS for opportunistic mode selection and user scheduling.

Regarding beamforming and communication modes, the system can potentially exploit different combinations of beamforming, FD capability, and more advanced receivers. Hence it may operate in a subset of several communication modes. Each mode is described in detail and signal to noise plus interference ratio (SINR) expressions are provided when the users are active in that mode. These expressions will be used to define performance values and scheduling measures based on which a communication mode and the corresponding users are selected for each timeslot. For simplicity of notation, the exemplary methods consider BS equipped with multiple antennas while the user terminals are equipped with single antenna each.

Regarding HD-UL and HD-DL modes, in these modes a single user is scheduled either in UL or DL. Virtual user $v_{i,0}$ ($v_{0,j}$) represents the case when user i (j) is activated in UL (DL) in HD mode (FIG. 1; 100A; 100B). If $v_{i,0}$ is activated at the RBt, the SINR for user $u_i$ is:

$$SINR_{i,0,t}^{HD,UL} = \frac{P_{i,t}^{UL} |W_i^H G_{i,t}|^2}{N_{UL}}$$

where $P_{i,t}^{UL}$ is the UL transmit power and $N_{UL}$ is the UL noise power. Similarly, if $v_{0,j}$ is activated at the RBt, the SINR for user $u_j$ is as follows:

$$SINR_{0,j,t}^{HD,DL} = \frac{P_{j,t}^{DL} |G_{j,t} U_j|^2}{N_{DL}}$$

where $P_{j,t}^{DL}$ is the BS transmit power and $N_{DL}$ is the DL noise power.

Regarding FD-IN mode, two different users are activated, one in each direction, and the DL user treats IUI as noise. If the virtual user $v_{i,j}$, $i \neq j$ is activated in the FD-IN mode as depicted in FIG. 2 (200A), the SINRs of users $u_i$ and $u_j$ are:

$$SINR_{i,j,t}^{FD-IN,UL} = \frac{P_{i,t}^{UL} |W_i^H G_{i,t}|^2}{P_{j,t}^{DL} \Psi_b + N_{UL}}$$

$$SINR_{i,j,t}^{FD-IN,DL} = \frac{P_{j,t}^{DL}|W_i^H G_{j,t}|^2}{P_{i,t}^{UL}|H_{i,j,t}|^2 + N_{DL}}$$

respectively, where $\Psi_b$ is the effective channel between transmit and receive terminals at the BS, which is inversely proportional to the level of SIM at the BS.

Regarding FD-SIC mode, it is assumed that an arbitrary fraction of the users are capable of SIC enabling the FD-SIC mode. In this mode, two different users are activated, one in each direction, and the DL user performs SIC to cancel IUI. If the virtual user $v_{i,j}$, $i \neq j$ is activated in FD-SIC mode (FIG. 2; 200B), the SINR of users $u_i$ and $u_j$ are given as:

$$SINR_{i,j,t}^{FD-SIC,UL} = \min\left\{ \frac{P_{i,t}^{UL}|W_i^H G_{i,t}|^2}{P_{j,t}^{DL}\Psi_b + N_{UL}}, \frac{P_{i,t}^{UL}|H_{i,j,t}|^2}{P_{j,t}^{DL}|G_{j,t}U_j|^2 + N_{DL}} \right\}$$

$$SINR_{i,j,t}^{FD-SIC,DL} = \frac{P_{j,t}^{DL}|G_{j,t}U_j|^2}{N_{DL}}$$

respectively. FD-SIC imposes two restrictions on the UL transmission rate. First, SIC requires the DL user to be able to decode the UL signal. Second, the BS needs to be able to decode the UL signal. Consequently, the UL rate must be chosen such that the UL signal is decodable at both DL user and the BS. As a result, the SINR of the UL user is defined as the minimum between the SINRs over UL and inter-user channels as in $SINR_{i,j,t}^{FD-SIC,UL}$.

As implied in $SINR_{i,j,t}^{FD-SIC,DL}$, the DL transmission is interference-free since IUI is cancelled.

Regarding FD-SIM mode, a single user is activated in both UL and DL directions. It is noted that this mode is only available if the user has FD capability. If the virtual user $v_{i,j}$ (FIG. 2; 100C) is activated, then the SINRs of user $u_i$ in UL and DL are given as:

$$SINR_{i,j,t}^{FD-SIM,UL} = \frac{P_{i,t}^{UL}|W_i^H G_{i,t}|^2}{P_{i,t}^{DL}\Psi_b + N_{UL}}$$

$$SINR_{i,j,t}^{FD-SIM,DL} = \frac{P_{i,t}^{DL}|W_i^H G_{i,t}|^2}{P_{i,t}^{UL}\Psi_u + N_{DL}}$$

respectively, where $\Psi_u$ is the effective channel between transmit and receive terminals at user $u_i$, which is inversely proportional to the SIM level at the user $u_i$.

Regarding system utility, for any given resource block, the channel realization, choice of beamforming vectors, the active virtual user, and the communication mode determine the resulting system utility for that RB. The exemplary methods take the resulting sum-rate as a measure of the system utility. The following describes the resulting utility from activating each of the virtual users.

The performance value corresponding to the HD virtual users $v_{i,0}$ and $v_{0,j}$ are defined as:

$$R_{i,0,t} = C(SINR_{i,0,t}^{HD,UL})$$

$$R_{0,j,t} = C(SINR_{0,j,t}^{HD,DL})$$

respectively, where $C(x) = \max\{\log_2(1+x), \gamma_{max}\}$ is the truncated Shannon rate and $\gamma_{max}$ models the maximum feasible spectral efficiency in the system. The virtual user $v_{i,j}$, $i \neq j$, can be activated in either of FD-IN and FD-SIC modes if the user $u_j$ is capable of SIC. The BS activates the virtual user in the mode which leads to the highest utility. Hence, the utility due to activating $v_{i,j}$ is given as:

$$R_{i,j,t} = \max_{X \in \mathcal{X}}\left[ C(SINR_{i,j,t}^{X,UL}) + C(SINR_{i,j,t}^{X,DL}) \right], i \neq j$$

where, $\mathcal{X} = \{FD-IN, FD-SIC\}$ if $u_j$ is capable of SIC, and $\mathcal{X} = \{FD-IN\}$ otherwise. Virtual user $v_{i,i}$ can only operate in FD-SIM mode. Therefore, the following is defined:

$$R_{i,i,t} = C(SINR_{i,i,t}^{FD-SMI,UL}) + C(SINR_{i,j,t}^{RD-SIM,DL})$$

In each timeslot, the system utilities due to activating different virtual users may depend on each other since each user is included in multiple virtual users. However, the performance values in different timeslots are independent of each other due to the independence of channel coefficients over time. The matrix of system utilities due to activating each of the virtual users is referred to as the performance matrix. The performance matrix is random, and its value depends on the realization of the underlying time-varying channel.

Regarding the performance matrix, the matrix of jointly continuous variables $(R_{i,j,t})i,j \in [n] \cup \{0\}$, $t \in \mathbb{N}$ is the performance matrix of the virtual users at the RBt. The sequence $(R_{i,j,t})i,j \in [n] \cup \{0\}$, $t \in \mathbb{N}$ is a sequence of independent matrices distributed identically according to the joint density $f_R^{n \times n}$.

The optimal beamforming vectors and communication mode for each virtual user is found by maximizing the weighted sum rate of all the users (both in uplink and downlink). As a result, if a virtual user is scheduled, it would be scheduled with the corresponding communication mode as well as uplink and downlink beamforming vectors.

Regarding opportunistic fair scheduling, the exemplary methods first explain the notion of fairness and then formally define a fair scheduler and its corresponding attributes and properties. The physical layer of 5G systems exploits OFDM where the resource blocks (RBs) are defined for a subset of OFDM tones and time window. The exemplary methods consider a scheduling problem where in each resource block only one of the communication modes discussed may be enabled. This means that one virtual user will be activated in each RB. Moreover, the exemplary methods consider a practical scheduler where the scheduling of the virtual users in the RBs that are overlapping in time are disjoint.

It is obvious that the scheduling of the resource blocks that are not overlapping in time is disjoint due to a causality constraint. However, one can imagine a more sophisticated case of a scheduling problem where the virtual users for the RBs that are overlapping in time happens jointly. However, such scheduler is very complex, and the optimal solution is not tractable. The practicality constraint imposed on the scheduling problem not only provides a low complexity solution but also has analytical tractability.

A particular scheduling sequence of RBs is considered where every two RBs of the sequence are ordered in such a way that the index of the RB which has a succeeding time window is larger. Formally, a pair of RBs at the positions i and j in the sequence that are denoted by RBi and RBj, respectively, and happening in time window Ti and Tj, respectively, the time window Tj succeeds (e.g., occurs after or at the same time as) the time window Ti, denoted by Tj>Ti if j>i.

The fairness with respect to scheduling sequence is defined, which means that the exemplary methods require the fraction of RBs in which each user is activated in DL or in UL is bounded below (and above). In a special case where each RB covers the entire OFDM symbol, the scheduling sequence is the natural time sequence, which leads to the temporal fairness criterion.

The vector of UL lower (upper) bounds $\underline{w}_{UL}{}^n(\overline{w}_{UL}{}^n)$ is called the UL lower (upper) demand vector. Similarly, the vector $\underline{w}_{DL}{}^n(\overline{w}_{DL}{}^n)$ is called the DL lower (upper) demand vector. The objective is to design a scheduling strategy satisfying the fairness constraints for a given sequence (potentially of finite length, i.e., in a given window-length) while maximizing the resulting system utility. Accordingly, a scheduling strategy is defined as follows.

Regarding the s-scheduler, the scheduling setup parametrized by $(n, \vee, \underline{w}_{UL}{}^n, \overline{w}_{UL}{}^n, \underline{w}_{DL}{}^n, \overline{w}_{DL}{}^n, f_R^{n \times n})$ is considered. A scheduling strategy $Q=(Q_t)_{t \in [s]}$ with respect to a sequence s with window-length $s \in \mathbb{N}$ (s-scheduler) is a family of (possibly stochastic) functions $Q_t: \mathbb{R}^{n \times n \times t} \to \vee, t \in [s]$, where:

The input to $Q_t$, $t \in [s]$, is the sequence of performance matrices $\mathbb{R}^{n \times n \times t}$ which includes t independently and identically distributed matrices with distribution $f_R^{n \times n}$).

It satisfies the resource demand constraints given by:

$$P(\underline{w}_{UL,i} \leq A_{UL,i,s}{}^Q \leq \overline{w}_{UL,i}, i \in [n])=1$$

$$P(\underline{w}_{DL,i} \leq A_{DL,i,s}{}^Q \leq \overline{w}_{DL,i}, i \in [n])=1$$

where, the UL and DL resource shares of user $u_i$, $i \in [n]$ up to the RB $t \in [s]$ is defined as:

$$A_{UL,i,t}^Q = \frac{1}{t}\sum_{k=1}^{t}\sum_{j=0}^{n}\mathbb{1}_{\{v_{i,j}=Q_k(R^{n \times n \times k})\}}, \forall i \in [n], t \in [s]$$

$$A_{DL,j,t}^Q = \frac{1}{t}\sum_{k=1}^{t}\sum_{i=0}^{n}\mathbb{1}_{\{v_{i,j}=Q_k(R^{n \times n \times k})\}}, \forall j \in [n], t \in [s]$$

In this context, a 1-scheduler is a scheduler that satisfies long-term fairness constraints. A scheduling setup where the user resource shares are required to take a specific value, e.g., $A_{i,s}^Q=w_i, i\in[n]$, is called a setup with equality share constraints and is parametrized by $(n, \vee, W_{UL}{}^n, w_{UL}{}^n, w_{DL}{}^n, w_{DL}{}^n, f_R^{n \times n})$. The following defines the set of feasible window-lengths and demand vectors given a virtual user set.

Regarding the feasible resource demands, for a virtual user set $\vee$, the window-length s, and demand vector $(w_{UL}{}^n, w_{DL}{}^n)$ are called feasible if a scheduling strategy satisfying equality demand constraints exists. The set of all feasible window-lengths and demand vectors $(s, w_{UL}{}^n, w_{DL}{}^n)$ is denoted by $S(\vee)$. Particularly, the set of feasible demand vectors for asymptotically large window lengths is defined as follows:

$$S_\infty(V) = \lim_{t \to \infty}\{\hat{w}^{2n} \mid \exists s : t \leq s \ \& \ (s, \hat{w}^{2n}) \in S(V)\}$$

where $\hat{w}^{2n}=(w_{UL}{}^n, w_{DL}{}^n)$. Furthermore, under inequality demand constraints, the scheduling setup with upper and lower resource demand vectors $(\underline{w}_{UL}{}^n, \overline{w}_{UL}{}^n, \underline{w}_{DL}{}^n, \overline{w}_{DL}{}^n)$ and window-length s is said to be feasible if:

$$\exists w_{UL}{}^n, w_{UL}{}^n : (s, w_{UL}{}^n, w_{UL}{}^n) \in Z(\vee),$$

$$\underline{w}_{UL}{}^n \leq w_{UL}{}^n \leq \overline{w}_{UL}{}^n, \underline{w}_{DL}{}^n \leq w_{DL}{}^n \leq \overline{w}_{DL}{}^n.$$

The average system utility of an s-scheduler Q is:

The average system utility up to the resource index t, is defined as:

$$U_t^Q = \frac{1}{t}\sum_{k=1}^{t}\sum_{i \in [n]}\sum_{j \in [n]}R_{i,j,k}\mathbb{1}_{\{v_{i,j}=Q_k(R^{n \times n \times k})\}}$$

The variable $U_s^Q$ is called the average system utility for the s-scheduler. An s-scheduler $Q^*_s$ is optimal if and only if $Q^*_s \in \text{argmax}_{Q \in Q_s}U_s^Q$, where $Q_s$ is the set of all s-schedulers for the scheduling setup. The optimal utility is denoted by $U^*_s$.

The objective is to study properties of $U^*_s$ and design scheduling strategies achieving the maximum average system utility under resource fairness constraints.

The set of feasible resource demand vectors under long-term and short-term fairness constraints are described below. The set is a function of the FD capability of the users' devices. For instance, in the event that user i does not have FD capability, the constraint $w_{UL,i}+w_{DL,i} \leq 1$ must hold. The reason is that the ith user can be activated either in UL or DL at each timeslot since it does not possess FD capability. The feasible demand region under long-term fairness constraints (e.g., $S_\infty(\vee)$) is first considered. The exemplary methods provide closed form expression for the feasible region as a function of the users' FD capability. Then, The exemplary methods investigate feasibility under short-term fairness constraints.

Regarding feasibility under long-term fairness, recall that the virtual user set includes $v_{i,j}, i \neq j, i, j \in [n] \cup \{0\}$ along with $v_{i,i}$ if the ith user possesses the FD capability. Without loss of generality, it is assumed that only the first k users have the FD capability (e.g., $v_{i,i} \in \vee \Leftrightarrow i \leq k$). The feasible resource demand region $S_\infty(\vee)$ is characterized below.

Regarding theorem 1, for the scheduling setup with virtual user set $\vee=\{v_{i,j} \mid i \neq j, i,j \in \{0\} \cup [n]\} \cup \{v_{i,i} \mid i \leq k\}$, the following holds:

$$(w_{UL}^n, w_{UL}^n) \in S_\infty(V) \Longleftrightarrow \begin{cases} \sum_{k \in [n]}w_{UL,i} \leq 1, \\ \sum_{k \in [n]}w_{DL,i} \leq 1, \\ \sum_{k \in [n]}w_{UL,i} + w_{DL,i} \geq 1, \\ w_{UL,i} + w_{DL,i} \leq 1, \ k < i \end{cases}$$

Regarding feasibility under short-term fairness, in the next step, the exemplary methods consider feasibility under short-term resource fairness constraints, where the fairness constraints must be satisfied in window-length s. The following theorem provides the feasible region.

Regarding theorem 2, for the scheduling setup with virtual user set $\vee=\{v_{i,j} \mid i \neq j, i,j \in \{0\} \cup [n]\} \cup \{v_{i,i} \mid i \leq k\}$, the window-length s and vector $(w_{UL}{}^n, w_{UL}{}^n)$ are feasible (e.g., $(s; w_{UL}{}^n, w_{UL}{}^n) \in S(\vee))$ if and only if:

$$\exists a_{i,j}, a_{0,j}, a_{0,i} \in [s]: \begin{cases} sw_{UL,i} = \sum_{j \in [n]}a_{i,j} + a_{i,0}, i \in [n], \\ sw_{DL,j} = \sum_{k \in [n]}a_{k,j} + a_{0,j}, j \in [n], \\ \sum_{k,j \in [n]}a_{i,j} + \sum_{k \in [n]}(a_{k,0} + a_{0,k}) = s \\ a_{i,j} = 0, \ K < i, \\ a_{i,j} \geq 0, i, j \in [n] \end{cases}$$

Note that in theorem 2, the exemplary methods must have $$w_{UL,i} = \frac{k_{UL,i}}{s}, i \in [n], w_{DL,i} = \frac{k_{DL,i}}{s}, i \in [n],$$

where $k_{UL,i}, k_{DL,i} \in [s]$, $i \in [n]$. The variable $a_{i,j}$ can be viewed as the resource share of the user $v_{i,j}$. The forward proof follows by noting that the first two bounds ensure that the resource fairness constraints are satisfied, and the third bound must hold since a virtual user must be activated at each timeslot. The fourth set of constraints follows from the fact that user $u_i$, $i>k$ does not have the FD capability. The converse proof follows by constructing a round robin scheduler, which activates $v_{i,j}$ for $a_{i,j}$ of the time. It is noted that the proof depends on the structure of virtual users.

Further, it is shown that a class of schedulers called threshold-based schedulers can achieve optimal utility under long-term resource fairness constraints. Furthermore, the exemplary methods introduce a scheduler, which satisfies short-term fairness constraints whose performance converges to optimal performance as the scheduling window-length is increased asymptotically.

Regarding scheduling under long-term fairness constraints, the following defines threshold-based schedulers.

For the scheduling setup $(n, \bigvee, \underline{w}_{UL}^n, \overline{w}_{UL}^n, \underline{w}_{DL}^n, \overline{w}_{DL}^n, f_R^{n \times n})$ a threshold based strategy (TBS) is characterized by the pair $(\lambda_{UL}^n, \lambda_{DL}^n) \in \mathbb{R}^{2n}$. The strategy $Q_{TBS}(\lambda_{UL}^n, \lambda_{DL}^n) = (Q_{TBS,t})_t \in \mathbb{N}$ is defined as:

$$Q_{TBS,t}(R^{n \times n \times t}) = \underset{v_{i,j} \in V}{\mathrm{argmax}} M(v_{i,j} R_{i,j,t}), t \in \mathbb{N}$$

where $M(v_{i,j} R_{i,j,t}) = R_{i,j,t} + \lambda_{UL,i} + \lambda_{DL,j}$ is the "scheduling measure" corresponding to the virtual user $v_{i,j}$, and $\lambda_{UL,0} = \lambda_{DL,0} = 0$. The resulting resource shares are represented as $w_{UL,i} = A_{UL,i}^{Q_{TBS}}, i \in [n]$ and $w_{DL,i} = A_{DL,i}^{Q_{TBS}}, i \in [n]$. The utility of the TBS is written as $U_w^n(\lambda_{UL}^n, \lambda_{DL}^n)$. The set of threshold-based strategies is denoted by $Q_{TBS}$.

Regarding practical construction algorithms, the optimal thresholds in TBS depend on the statistics of the performance matrix $R^{n \times n}$, which is usually unavailable in practice. An online algorithm is introduced to find the optimal thresholds in an online fashion only by observing the realization of the performance matrix at each time-slot which can be obtained after channel estimation. Algorithm 1 constructs an optimal TBS using the complementary slackness conditions.

The algorithm starts with a vector of initial thresholds (e.g., all-zero thresholds). At time-slot t, the algorithm chooses virtual user $v_{i^*j^*,t}$ to be activated based on the threshold vector $(\lambda_{UL,t}^n, \lambda_{DL,t}^n)$. It updates the resource shares and thresholds based on the scheduling decision at the end of the timeslot (line 2-7). The update rule for the thresholds given in lines 6 and 7 are based on a variation of the Robbins-Monro update. The parameter c is the step-size. Lines 8-23 verify that the resource demand constraints and dual feasibility conditions are satisfied. The computational complexity of the algorithm is proportional to the number of virtual users which is $O(n^2)$.

Regarding scheduling under short-term fairness constraints, the exemplary methods provide a class of scheduling strategies called augmented threshold based strategies (ATBS) for FD systems, which satisfy hard short-term resource fairness constraints. More precisely, the strategy satisfies the resource fairness constraints in a given window-length s with probability one. It is shown that the average utility due to the proposed scheduler converges to the optimal utility as the length of the scheduling window is taken to be asymptotically large. The scheduling strategy has two phases of operation, that is, a TBS phase and a compensation phase. In the TBS phase, the strategy operates like the optimal TBS designed for long-term fairness constraints. In the compensation phase, the strategy activates virtual users in a way to ensure that the resource fairness criteria are satisfied regardless of the resulting utility. The ATBSs are formally defined below.

Regarding the ATBS, for the scheduling setup $(n, \bigvee, \underline{w}_{UL}^n, \overline{w}_{UL}^n, \underline{w}_{DL}^n, \overline{w}_{DL}^n, f_R^{n \times n})$ with window-length $s \in \mathcal{S}$, an ATBS is characterized by the pair of vectors $(\lambda_{UL}^n, \lambda_{DL}^n) \in \mathbb{R}^{2n}$.

The strategy $Q_{ATBS}$ (s, $\lambda_{UL}^n$, $\lambda_{DL}^n$) = $(Q_{TBS,t})_t \in \mathbb{N}$ is defined as:

$$Q_{ATBS,t}(R^{n \times N \times T}) = \underset{v_{i,j} \in V_t}{\mathrm{argmax}} M(v_{i,j} R_{i,j,t}), t \in \mathbb{N}$$

where $M(v_{i,j} R_{i,j,t})$ is the scheduling measure in Definition 5, and $\bigvee_t$ is the 'feasible virtual user set' at the RB t and includes all virtual users $v_{1,3}$ satisfying the following conditions:

$$s - t \geq \sum_{i \in [n]} \left( \lceil s \underline{w}_{UL,i} \rceil - (t-1) A_{UL,i,t-1}^Q \tilde{\Sigma}_t^{\lambda} \right)$$

$$s - t \geq \sum_{i \in [n]} \left( \lceil s \underline{w}_{DL,i} \rceil - (t-1) A_{DL,i,t-1}^Q \tilde{\Sigma}_t^{\lambda} \right)$$

| Algorithm I Heuristic Threshold Optimization in TBS |
|---|
| Input Performance matrix $R^{n \times n}$ at each time-slot |
| Initialization: $\lambda_{UL,i,1} = 0$, $\lambda_{DL,j,1} = 0$, i, j $\in$ [n] |
| 1:   for t $\in \mathbb{N}$ do |
| 2:     $v_{i^*j^*,i} = Q_t(\lambda_{UL,t}^n, \lambda_{DL,t}^n)$ |
| 3:     $A_{UL,i,t+1}^Q = A_{UL,i,t+1}^Q + \frac{1}{t+1}(\mathbb{1}_{\{i=i^*\}} - A_{UL,i,t}^Q), i \in [n]$ |
| 4:     $A_{DL,j,t+1}^Q = A_{DL,j,t+1}^Q + \frac{1}{t+1}(\mathbb{1}_{\{j=j^*\}} - A_{DL,j,t}^Q), j \in [n]$ |
| 5:     $\lambda_{min} = \min_{i \in [n]} \{\lambda_{UL,i,t}, \lambda_{DL,i,t}\}$ |
| 6:     $\lambda_{UL,i,t+1} = \lambda_{UL,i,t} - c(\lambda_{UL,i,t} - \lambda_{min})(\mathbb{1}_{\{i=j^*\}} - \underline{w}_{UL,i}), i \in [n]$ |
| 7:     $\lambda_{DL,j,t+1} = \lambda_{DL,j,t} - c(\lambda_{UL,j,t} - \lambda_{min})(\mathbb{1}_{\{i=j^*\}} - \underline{w}_{DL,j}), j \in [n]$ |
| 8:     for i = 1 to n do |
| 9:       if $\lambda_{UL,i,t} = \lambda_{min}$ and $\lambda_{UL,i,t+1}^Q < \underline{w}_{UL,i}$ then |
| 10:        $\lambda_{UL,i,t+1} = \lambda_{UL,i,t} + c(\underline{w}_{UL,i} - \overline{\lambda}_{UL,i,t+1}^Q)$ |
| 11:       end if |
| 12:       if $\lambda_{UL,i,t} = \lambda_{min}$ and $\lambda_{min} < 0$ then |
| 13:        $\lambda_{UL,i,t+1} = \lambda_{UL,i,t+1} + c$ |
| 14:       end if |
| 15:     end for |
| 16:     for j = 1 to n do |
| 17:       $\lambda_{DL,j,t} = \lambda_{min}$ and $\lambda_{DL,j,t+1}^Q < \underline{w}_{DL,j}$ then |
| 18:        $\lambda_{DL,j,t+1} = \lambda_{DL,j,t} + c(\underline{w}_{DL,j} - \overline{\lambda}_{DL,j,t+1}^Q)$ |
| 19:       end if |
| 20:       if $\lambda_{DL,j,t} = \lambda_{min}$ and $\lambda_{min} < 0$ then |
| 21:        $\lambda_{DL,j,t+1} = \lambda_{DL,j,t+1} + c$ |
| 22:       end if |
| 23:     end for |
| 24:   end for |

$$s - t \leq \sum_{i \in [n]} \left( \lfloor s \overline{w}_{UL,i} \rfloor - (t-1) A^Q_{UL,i,t-1} - \Sigma_i \cdot \right)$$

where $x^+ = x \times \mathbb{1}_{x \geq 0}$, $\mathcal{A}_{i,j} = \{v_{i,j} = Q_{TBS,t}(R^{n \times n \times})\}$, $W_{TBS}$ is the TBS with threshold vector $(\lambda_{UL}^n, \lambda_{DL}^n)$, and it is assumed that only the first k users possess the FD capability.

For a given pair of threshold vectors $(\lambda_{UL}^n, \lambda_{DL}^n)$, the steps in the corresponding ATBS strategy is described in Algorithm 2 reproduced below.

| Algorithm 2 Augmented Threshold Based Strategy (ATBS) |
| --- |
| Inputs:    i)    The realization of performance matrix $R^{n \times n}$ at each time-slot, <br>         ii)    UL and DL threshold vectors $\lambda_{UL}^n, \lambda_{DL}^n$ <br> 1:    $V_0 = V$ <br> 2:    for t = 1 to s with step-size 1 do <br> 3:       $V_t = \phi$ <br> 4:       for i, j: $v_{i,j} \in V_{t-1}$ do <br> 5:           if Equations (25), (26), (27), and (28) are satisfied then <br> 6:              $V_t = Vt \cup \{\mathcal{V}_i\}$ <br> 7:           end if <br> 8:       end for <br> 9:       $Q_{ATBS,t}(R^{n \times n \times t}) = \underset{v_{i,j} \in V_t}{\mathrm{argmax}} M(v_{i,j}, R_{t,i,j})$ <br> 10.    end for |

In this algorithm, each of the time-slot equations ensure that the uplink and downlink lower resource demands can be satisfied if the TBS with threshold vector $(\lambda_{UL}^n, \lambda_{DL}^n)$ is used in the next timeslot.

The first equation below ensures the satisfaction of the upper resource demands.

The second equation below ensures that the users, which do not possess the FD capability are not required to be scheduled in UL and DL simultaneously in the remaining timeslots in order to satisfy the resource demands.

$$+ \sum_{i \in [n]} \left( \lfloor s \overline{w}_{DL,i} \rfloor - (t-1) A^Q_{DL,i,t-1} \Sigma_i \cdot \right)$$

$$s - t \geq \max_{i > k} \left( \left( \lceil s \underline{w}_{UL,i} \rceil - (t-1) A^Q_{UL,i,t-1} \Sigma_i \cdot \right) + \left( \lceil s \underline{w}_{DL,i} \rceil - (t-1) A^Q_{DL,i,t-1} \Sigma_i \cdot \right) \right)$$

The following theorem shows that for asymptotically large scheduling window-lengths, the utility of the ATBSs converge to the optimal utility which is achieved by TBSs.

For the scheduling setup $(n, \vee, \underline{w}_{UL}^n, \overline{w}_{UL}^n, \underline{w}_{DL}^n, \overline{w}_{DL}^n, f_R^{n \times n})$ let $(\lambda^*_{UL}^n, \lambda^*_{DL}^n)$ be the threshold vectors of the TBS which achieves optimal average utility under long-term fairness constraints (e.g., $s \to \infty$) and $(w^*_{DL}^n, w^*_{DL}^n)$ the corresponding resource share vectors. Then, $$\lim_{s \to \infty} U_s^* = U^*.$$

Regarding optimality independent of the scheduling sequence, the thresholds are just a function of the distributions of the rate vectors and the threshold are independent of the actual realizations of the channel. Hence, even though the exemplary methods formalized the problem for a given scheduling sequence, the actual choice of scheduling sequence is irrelevant when it comes to the optimality of the algorithm. It is worth reiterating that even though the exemplary methods proved that threshold-based strategies are optimal strategies for the practical schedulers which consider disjoint scheduling over the RBs that share the same time interval, it is not optimal with respect to a more general class of schedulers that jointly assign the set of virtual users over a different subset of tones in a frequency domain.

In conclusion, the exemplary methods introduce opportunistic user scheduling under long-term and short-term fairness in single-cell wireless communication systems. The fairness is defined in terms of the share of resource blocks (RBs) that are assigned to each user where the RB is the smallest unit of time-frequency resource that can be assigned to a user. Particularly, the resource fairness is investigated when the RBs are defined as an ordered sequence in time. The exemplary methods prove that the exemplary scheduling framework achieves the optimal performance irrespective of the choice of the initial RB sequence. The notion of resource fairness is akin to temporal fairness which is of interest in delay-sensitive applications and leads to predictable latency and power consumption.

Moreover, the feasible region of RB fairness vectors is derived, and an optimal user scheduling strategy maximizing the system utility while satisfying long-term resource fairness is introduced. Additionally, a short-term resource fair scheduling strategy is devised, which satisfies user resource demands over a finite window-length. The exemplary methods show that the short-term fairness strategy is asymptotically optimal and achieves the average system utility as the window-length is increased. Subsequently, practical low complexity construction algorithms for long-term and short-term resource fair scheduling are introduced.

The proposed scheduling framework also includes optimal transmit and receive beamforming, power optimization, as well as optimal user communication mode selection. The user communication mode for each resource block includes scheduling either a single user in DL, a single user in the uplink, a user in the uplink and a user in the downlink using conventional receiver by treating the inter-user-interference (IUI) as noise, a pair of user in the uplink and downlink by using successive interference cancellation and advanced receiver (SIC), or scheduling a single user in full duplex (FD) mode.

The proposed algorithms are then used to investigate the impacts of beamforming and availability of SIC and FD capability at user terminals on the network throughput. It is observed that having FD capability at user terminals, using successive interference cancellation and advance receivers, and beamforming can lead to substantial improvement in the system throughput.

Figure 3:
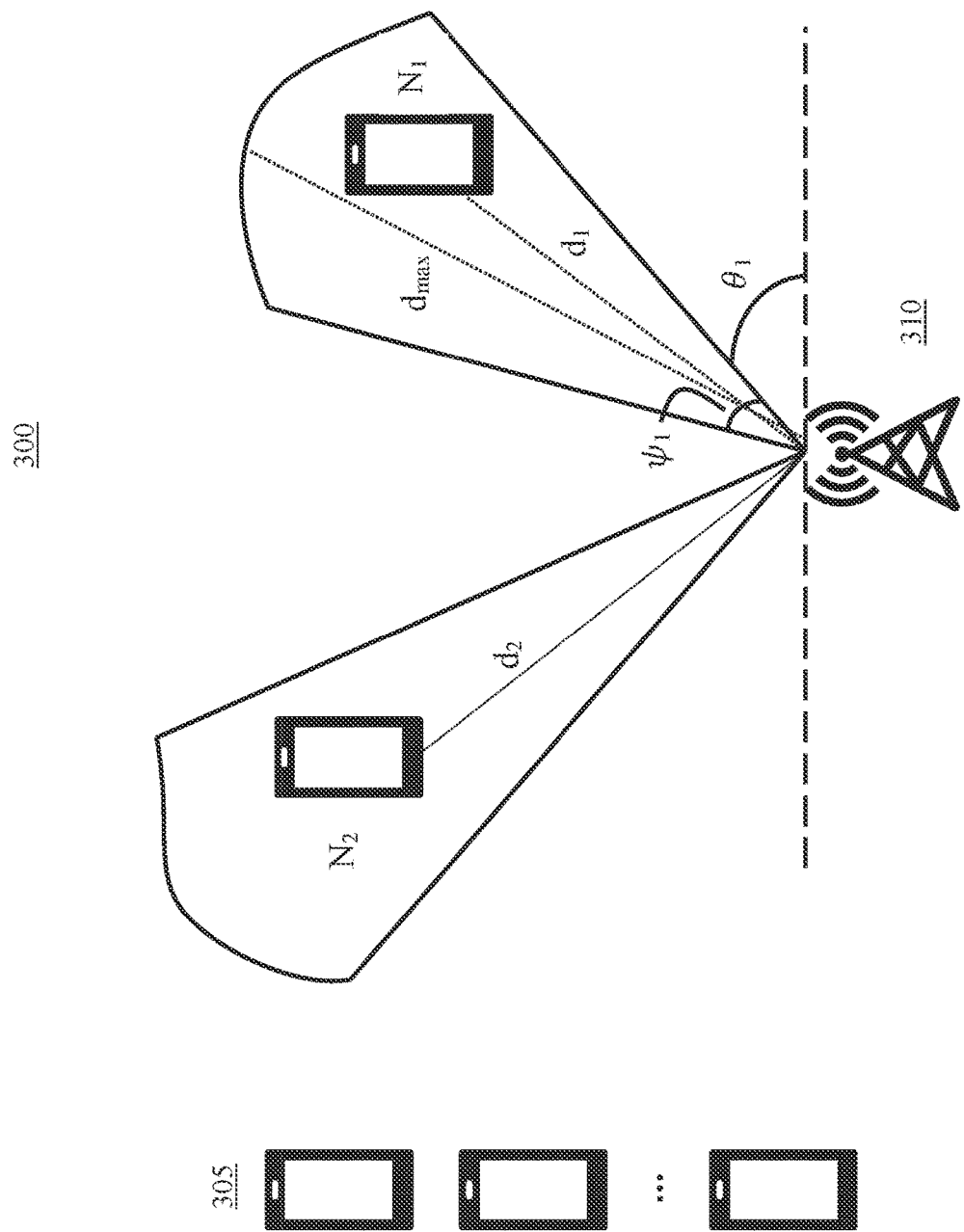
FIG. 3 is a block/flow diagram illustrating a single-cell communication network with a single base station and a plurality of users handing a plurality of mobile devices, in accordance with embodiments of the present invention.

FIG. 3 is a block/flow diagram illustrating a single-cell communication network with a single base station and a plurality of users handing a plurality of mobile devices, in accordance with embodiments of the present invention.

The single-cell millimeter wave (mmWave) network 300 includes a base station 310 and mobile devices 305 handled by a plurality of users N. The base station 310 is located at the origin and the mobile devices or users are located at an angular coordinate $\theta_1$ and at distance $d_1$ from the base station 310. $d_{max} > 0$ is a coverage area of the base station 310 and $\psi_1$ denotes the vector of random AoDs corresponding to the spatial clusters in the channel from the base station 310.

Figure 4:
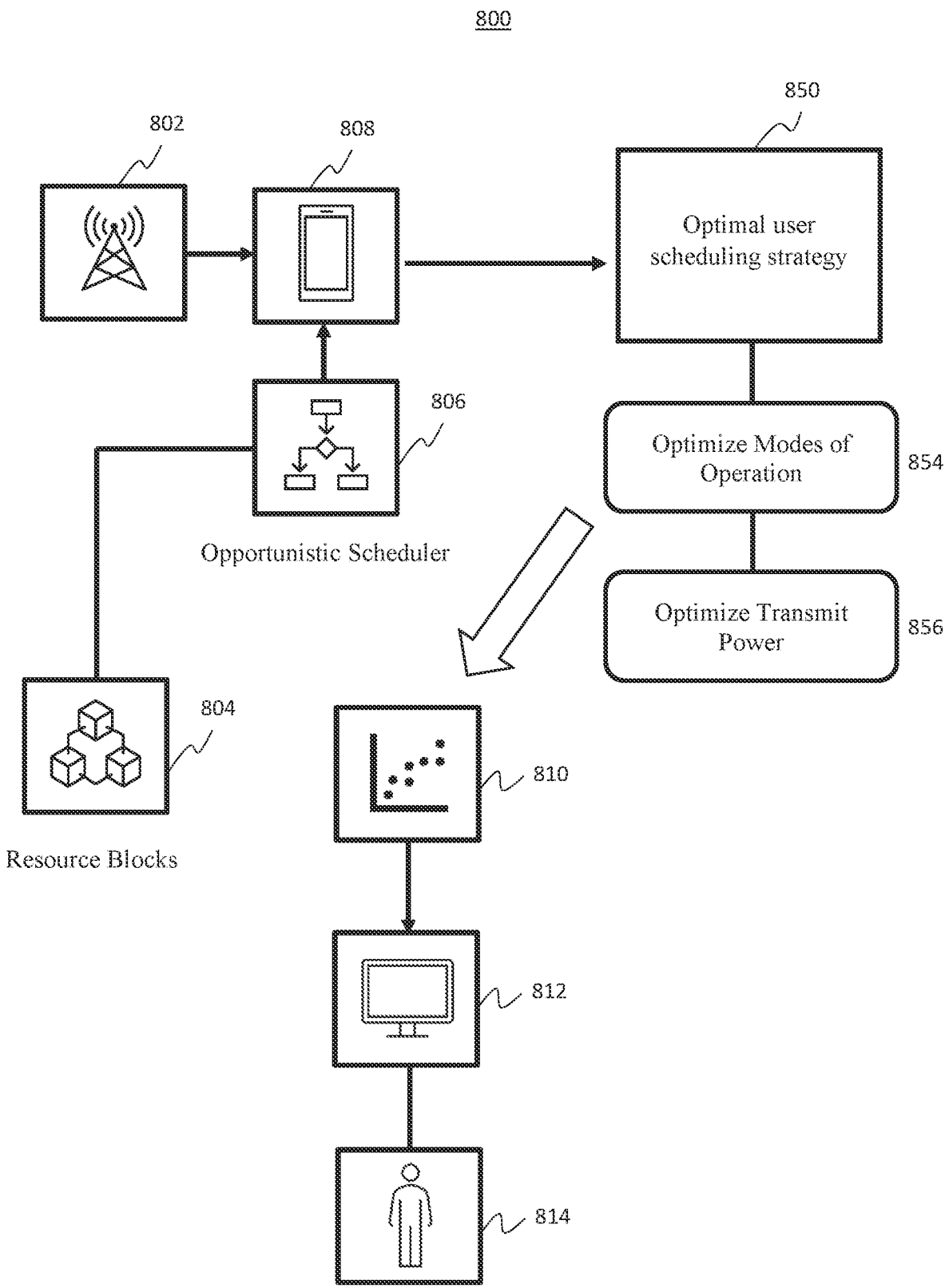
FIG. 4 is an exemplary practical application for implementing opportunistic user scheduling under long-term and short-term resource fairness constraints, in accordance with embodiments of the present invention.

FIG. 4 is a block/flow diagram 800 of a practical application for implementing opportunistic user scheduling under long-term and short-term resource fairness constraints, in accordance with embodiments of the present invention.

In one practical example, a transmitter 802 is in communication with a receiver 808, where an opportunistic scheduler 806 employing resource blocks 804 is used to obtain an optimal user scheduling strategy 850 by optimizing modes of operation 854 and optimizing transmit power 856. The results 810 (e.g., variables or parameters or factors or communications or strategies) can be provided or displayed on a user interface 812 handled by a user 814.

Regarding the practical applications of the exemplary embodiments, the novelty of 5G is the integration of multiple networks serving diverse sectors, domains and applications, such as multimedia, virtual reality (VR) and augmented reality (AR), machine to machine (M2M) and internet of things (IoT), automotive applications, smart city, etc. The diversity of the 5G applications and their related service requirements in terms of data rate, latency, reliability, and other parameters leads to the necessity for operators to provide a diverse set of 5G networks.

Among the various innovations enabling 5G, one of main necessities and realities is the use of mmWave spectrum be coupled with network densification and massive multiple input, multiple output (MIMO) to serve as an ultra-high-speed access and backhaul systems. A key ingredient for 5G is to enable applications in the mmWave spectrum, such as mobile edge computing (MEC), which is expected to bring information and processing closer to the mobile users and enable ultra-high speed and low latency communications. The exemplary embodiments of the present invention can allow such applications to be successfully implemented.

Figure 5:
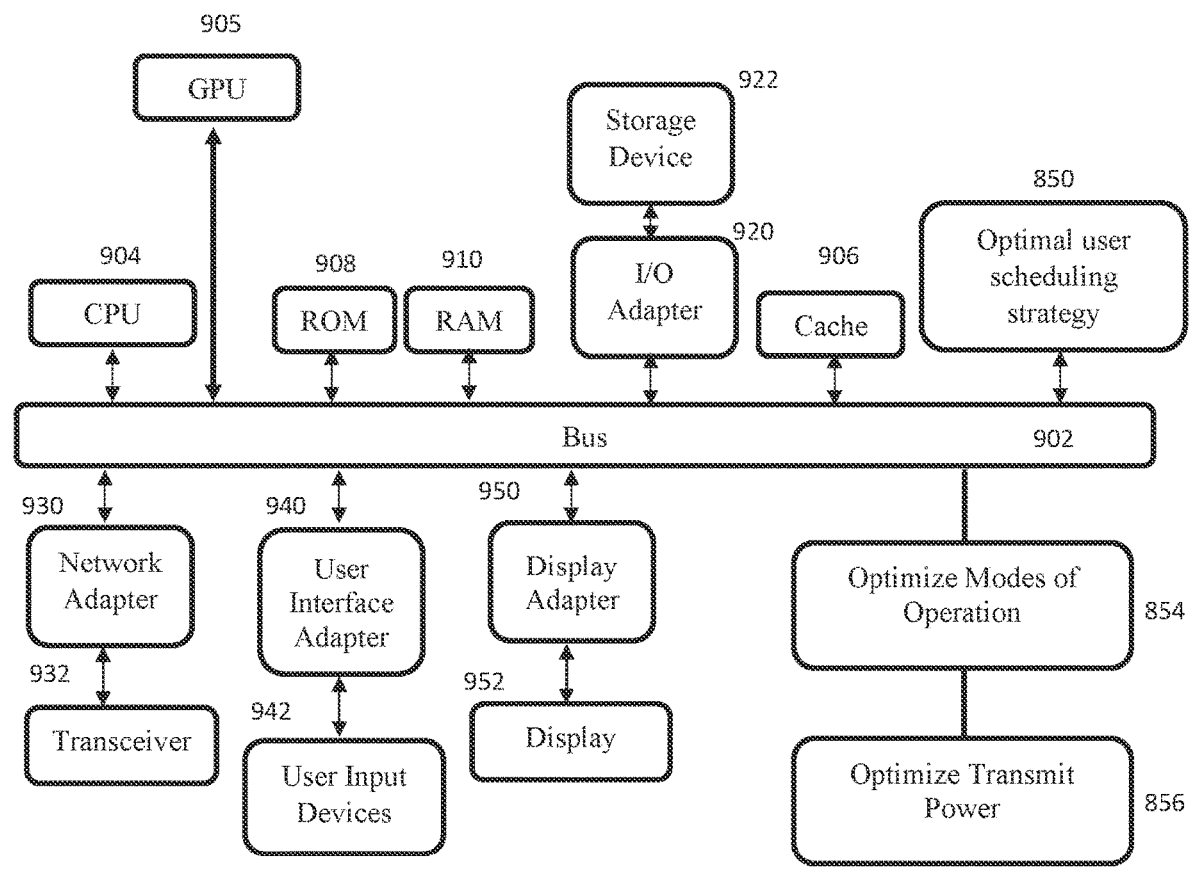
FIG. 5 is an exemplary processing system for implementing opportunistic user scheduling under long-term and short-term resource fairness constraints, in accordance with embodiments of the present invention.

FIG. 5 is an exemplary processing system for implementing opportunistic user scheduling under long-term and short-term resource fairness constraints, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, a transmitter 802 is in communication with a receiver 808, here an opportunistic scheduler 806 employing resource blocks 804 is used to obtain an optimal user scheduling strategy 850 by optimizing modes of operation 854 and optimizing transmit power 856.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
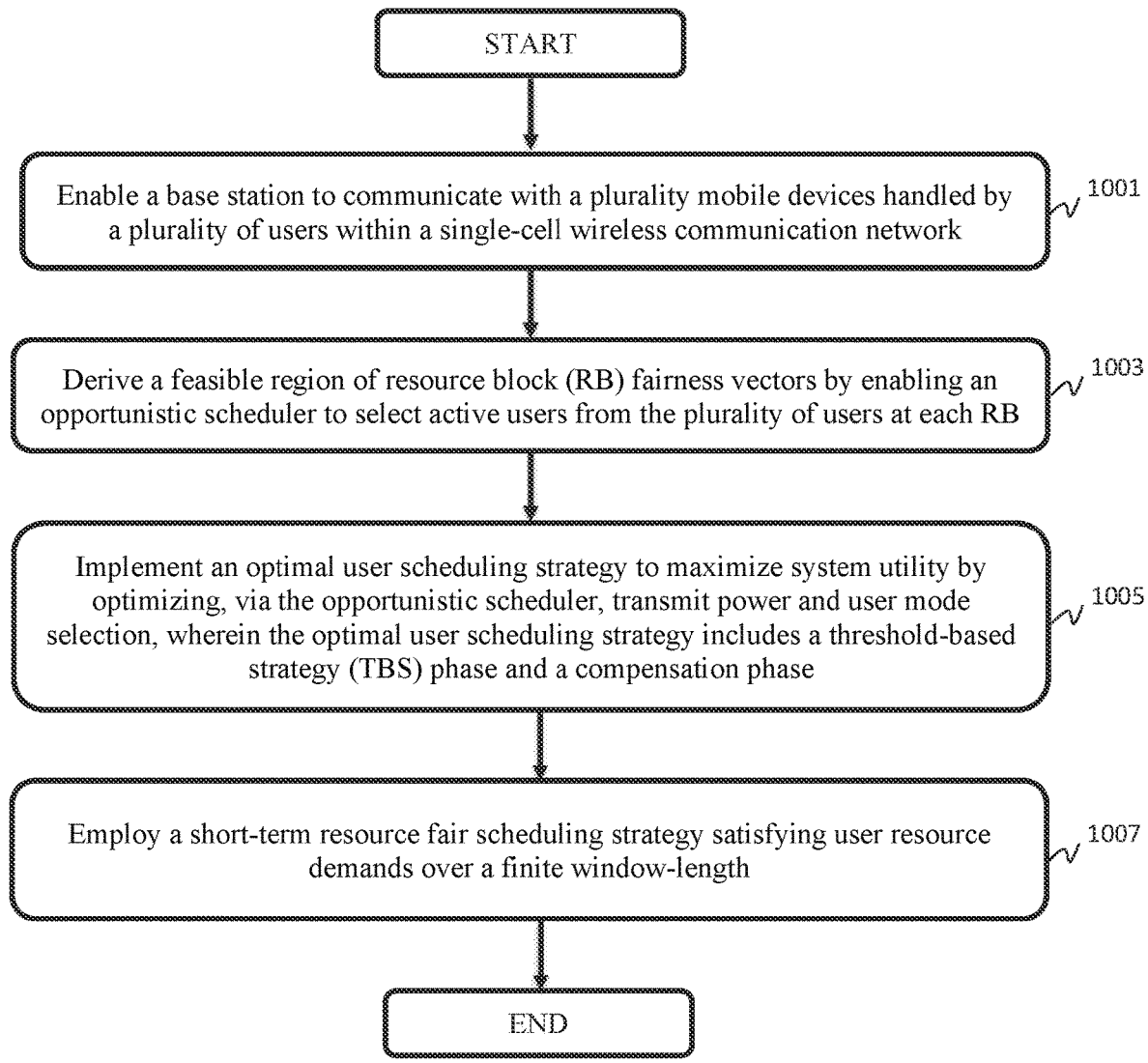
FIG. 6 is a block/flow diagram of an exemplary method for implementing opportunistic user scheduling under long-term and short-term resource fairness constraints, in accordance with embodiments of the present invention.

FIG. 6 is a block/flow diagram of an exemplary method for implementing opportunistic user scheduling under long-term and short-term resource fairness constraints, in accordance with embodiments of the present invention.

At block 1001, enabling a base station to communicate with a plurality mobile devices handled by a plurality of users within a single-cell wireless communication network.

At block 1003, deriving a feasible region of resource block (RB) fairness vectors by enabling an opportunistic scheduler to select active users from the plurality of users at each RB.

At block 1005, implementing an optimal user scheduling strategy to maximize system utility by optimizing, via the opportunistic scheduler, transmit power and user mode selection, wherein the optimal user scheduling strategy includes a threshold-based strategy (TBS) phase and a compensation phase.

At block 1007, employing a short-term resource fair scheduling strategy satisfying user resource demands over a finite window-length.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing opportunistic user scheduling under long-term and short-term resource fairness constraints, the method comprising:
   enabling a base station to communicate with a plurality mobile devices handled by a plurality of users within a single-cell wireless communication network;
   deriving a feasible region of resource block (RB) fairness vectors by enabling an opportunistic scheduler to select active users from the plurality of users at each RB;
   implementing an optimal user scheduling strategy to maximize system utility by optimizing, via the opportunistic scheduler, transmit power and user mode selection, wherein the optimal user scheduling strategy includes a threshold-based strategy (TBS) phase and a compensation phase, a communication mode for each RB includes scheduling a single user of the plurality of users in full duplex (FD) mode, and a utility for the single user is:

$$R_{i,i,t}=C(\text{SINR}_{i,i,t}^{FD\text{-}SIM,UL})+C(\text{SINR}_{i,i,t}^{FD\text{-}SIM,DL})$$

where $C(\bullet)$ is a truncated Shannon rate, $\text{SINR}_{i,i,t}^{FD\text{-}SIM,UL}$ is a signal to noise plus interference ratio for FD with self-interference mitigation in the uplink direction, and $\text{SINR}_{i,i,t}^{FD\text{-}SIM,UL}$ it is a signal to noise plus interference ratio for FD with self-interference mitigation in the downlink direction, for the user i in time slot RB t; and employing a short-term resource fair scheduling strategy satisfying user resource demands over a finite window-length.

2. The method of claim 1, wherein the short-term resource fair scheduling strategy is asymptotically optimal and achieves an average system utility as the window-length is increased.

3. The method of claim 1, wherein a user communication mode for each RB includes scheduling a single user of the plurality of users in a downlink (DL) communication.

4. The method of claim 1, wherein a user communication mode for each RB includes scheduling a single user of the plurality of users in an uplink (UL) communication.

5. The method of claim 4, wherein a user communication mode for each RB includes scheduling a user of the plurality of users in an UL communication and another user of the plurality of users in a DL communication by treating inter-user-interference (IUI) as noise.

6. The method of claim 1, wherein a user communication mode for each RB includes scheduling a pair of users of the plurality of users in an UL and DL communication by using successive interference cancellation (SIC).

7. A non-transitory computer-readable storage medium comprising a computer-readable program for implementing opportunistic user scheduling under long-term and short-term resource fairness constraints, wherein the computer-readable program when executed on a computer causes the computer to perform the steps of:

enabling a base station to communicate with a plurality mobile devices handled by a plurality of users within a single-cell wireless communication network;

deriving a feasible region of resource block (RB) fairness vectors by enabling an opportunistic scheduler to select active users from the plurality of users at each RB;

implementing an optimal user scheduling strategy to maximize system utility by optimizing, via the opportunistic scheduler, transmit power and user mode selection, wherein the optimal user scheduling strategy includes a threshold-based strategy (TBS) phase and a compensation phase, a communication mode for each RB includes scheduling a single user of the plurality of users in full duplex (FD) mode, and a utility for the single user is:

$$R_{i,i,t}=C(\text{SINR}_{i,i,t}^{FD\text{-}SIM,UL})+C(\text{SINR}_{i,i,t}^{FD\text{-}SIM,DL})$$

where $C(\bullet)$ is a truncated Shannon rate, $\text{SINR}_{i,i,t}^{FD\text{-}SIM,UL}$ is a signal to noise plus interference ratio for FD with self-interference mitigation in the uplink direction, and $\text{SINR}_{i,i,t}^{FD\text{-}SIM,UL}$ is a signal to noise plus interference ratio for FD with self-interference mitigation in the downlink direction, for the user i in time slot t; and employing a short-term resource fair scheduling strategy satisfying user resource demands over a finite window-length.

8. The non-transitory computer-readable storage medium of claim 7, wherein the short-term resource fair scheduling strategy is asymptotically optimal and achieves an average system utility as the window-length is increased.

9. The non-transitory computer-readable storage medium of claim 7, wherein a user communication mode for each RB includes scheduling a single user of the plurality of users in a downlink (DL) communication.

10. The non-transitory computer-readable storage medium of claim 7, wherein a user communication mode for each RB includes scheduling a single user of the plurality of users in an uplink (UL) communication.

11. The non-transitory computer-readable storage medium of claim 10, wherein a user communication mode for each RB includes scheduling a user of the plurality of users in an UL communication and another user of the plurality of users in a DL communication by treating inter-user-interference (IUI) as noise.

12. The non-transitory computer-readable storage medium of claim 7, wherein a user communication mode for each RB includes scheduling a pair of users of the plurality of users in an UL and DL communication by using successive interference cancellation (SIC).

13. A system for implementing opportunistic user scheduling under long-term and short-term resource fairness constraints, the system comprising:

a memory; and one or more processors in communication with the memory configured to:

enable a base station to communicate with a plurality mobile devices handled by a plurality of users within a single-cell wireless communication network;

derive a feasible region of resource block (RB) fairness vectors by enabling an opportunistic scheduler to select active users from the plurality of users at each RB;

implement an optimal user scheduling strategy to maximize system utility by optimizing, via the opportunistic scheduler, transmit power and user mode selection, wherein the optimal user scheduling strategy includes a threshold-based strategy (TBS) phase and a compensation phase, a communication mode for each RB includes scheduling a single user of the plurality of users in full duplex (FD) mode, and a utility for the single user is;

$$R_{i,i,t}=C(\text{SINR}_{i,i,t}^{FD\text{-}SIM,UL})+C(\text{SINR}_{i,i,t}^{FD\text{-}SIM,DL})$$

where $C(\bullet)$ is a truncated Shannon rate, $\text{SINR}_{i,i,t}^{FD\text{-}SIM,UL}$ is a signal to noise plus it interference ratio for ED with self-interference mitigation in the uplink direction, and $\text{SINR}_{i,i,t}^{FD\text{-}SIM,UL}$ is a signal to noise plus interference ratio for FD with self-interference mitigation in the downlink direction, for the user i in time slot t; and employ a short-term resource fair scheduling strategy satisfying user resource demands over a finite window-length.

14. The system of claim 13, wherein the short-term resource fair scheduling strategy is asymptotically optimal and achieves an average system utility as the window-length is increased.

15. The system of claim 13, wherein a user communication mode for each RB includes scheduling a single user of the plurality of users in a downlink (DL) communication.

16. The system of claim 13, wherein a user communication mode for each RB includes scheduling a single user of the plurality of users in an uplink (UL) communication.

17. The system of claim 16, wherein a user communication mode for each RB includes scheduling a user of the plurality of users in an UL communication and another user of the plurality of users in a DL communication by treating inter-user-interference (IUI) as noise.

18. The system of claim 13, wherein a user communication mode for each RB includes scheduling a pair of users of the plurality of users in an UL and DL communication by using successive interference cancellation (SIC).

* * * * *